US011847306B1

(12) United States Patent
Lee

(10) Patent No.: US 11,847,306 B1
(45) Date of Patent: Dec. 19, 2023

(54) ROTATABLE INTERFACE WITH ANGLE DETERMINATION

(71) Applicant: Synaptics Incorporated, San Jose, CA (US)

(72) Inventor: Shao-Hua Lee, Taipei (TW)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/963,328

(22) Filed: Oct. 11, 2022

(51) Int. Cl.
*G06F 3/048* (2013.01)
*G06F 3/04845* (2022.01)
*G06F 3/044* (2006.01)

(52) U.S. Cl.
CPC .......... *G06F 3/04845* (2013.01); *G06F 3/044* (2013.01)

(58) Field of Classification Search
CPC .............................. G06F 3/04845; G06F 3/044
See application file for complete search history.

(56) References Cited

U.S. PATENT DOCUMENTS

| 10,921,913 | B1 | 2/2021 | Fong et al. |
| 11,163,406 | B2 | 11/2021 | Hoch et al. |
| 11,188,161 | B2 | 11/2021 | Shepelev |
| 11,256,376 | B2 | 2/2022 | Fong et al. |
| 11,360,614 | B1 | 6/2022 | Fong |
| 2018/0032174 | A1* | 2/2018 | Lee ........................ G06F 3/0416 |
| 2020/0004376 | A1* | 1/2020 | Knoppert .............. G06F 3/0418 |
| 2022/0244795 | A1* | 8/2022 | Mathieu ................. B60K 37/06 |

* cited by examiner

*Primary Examiner* — David E Choi
(74) *Attorney, Agent, or Firm* — Leydig, Voit & Mayer, Ltd.

(57) ABSTRACT

An input device that includes a processing system, a display panel and an interface is provided. The interface has a base portion with a plurality of base contacts disposed proximal to the display panel and in communication with the processing system, and one or more base reference contacts disposed proximal to the display panel and coupled to a reference signal. The interface also has the rotatable interface with a rotatable contact and an interface reference contact coupled to the rotatable contact and to the one or more base reference contacts. The rotatable interface is configured to rotate about an axis. Rotation of the rotatable interface corresponds to rotation of the rotatable contact and produces a variation of signal strength of resulting signals from at least one of the base contacts. The processing system is configured to determine an angle of rotation based on the variation of signal strength.

20 Claims, 9 Drawing Sheets

ROTATABLE INTERFACE WITH ANGLE DETERMINATION

TECHNICAL FIELD

This disclosure relates generally to a rotatable interface.

BACKGROUND

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones.

Proximity sensor devices may be implemented as part of a multimedia entertainment system of an automobile. In such cases, a rotatable interface, such as a knob, may be part of a proximity sensor device.

Rotatable interfaces may use an encoder rotary system that requires the rotary system to rotate through multiple states before the direction (e.g., clockwise versus counter-clockwise rotation) is determined. If the user rotates the knob by a single state, the system might not be capable of adjusting the setting as the direction (e.g., clockwise or counterclockwise) is unknown. In addition, rotatable interfaces may require a baseline calibration at boot-up, and have a reportable rotation "speed" that is fixed. Yet further, it may not be possible to detect the angle of rotation of the rotatable interface.

SUMMARY

One embodiment provides an input device that includes a processing system, a display panel and an interface. The interface has a base portion with a plurality of base contacts disposed proximal to the display panel and in communication with the processing system and one or more base reference contacts disposed proximal to the display panel and coupled to a reference signal. The interface also has the rotatable interface with a rotatable contact and an interface reference contact coupled to the rotatable contact and to the one or more base reference contacts. The rotatable interface is configured to rotate about an axis. Rotation of the rotatable interface corresponds to rotation of the rotatable contact and produces a variation of signal strength of resulting signals from at least one of the base contacts. The processing system is configured to determine an angle of rotation based on the variation of signal strength.

Another embodiment provides a method of determining an angle of rotation of a rotatable interface. The method includes determining a maximum relative signal strength of resulting signals from each of a plurality of base contacts; determining a plurality of effective areas, each effective area of the plurality of effective areas corresponding to an angular area between two base contacts of the plurality of base contacts; receiving a resulting signal corresponding to a signal strength of at least one base contact of the plurality of base contacts; and determining the angle of rotation of the rotatable interface based on the signal strength of the at least one base contact of the plurality of base contacts.

Yet another embodiment provides an interface with a base portion and a rotatable interface. The base portion incudes a plurality of base contacts configured to be disposed proximal to a display panel and in communication with a processing system and one or more base reference contacts configured to be disposed proximal to the display panel and coupled to a reference signal. The rotatable interface includes a rotatable contact and an interface reference contact coupled to the rotatable contact and configured to be coupled to the one or more base reference contacts. The rotatable interface rotates about an axis causing corresponding rotation of the rotatable contact. The interface is configured to produce a variation of signal strength of resulting signals at one or more of base contacts of the plurality of base contacts to provide for determination of an angle of rotation of the rotatable interface.

DETAILED DESCRIPTION

The following detailed description is merely exemplary in nature and is not intended to limit the disclosure or the application and uses of disclosed embodiments and methods. Furthermore, there is no intention to be bound by any expressed or implied theory presented in the preceding background, summary, brief description of the drawings or the description that follows.

The description may use perspective-based descriptions such as top/bottom, in/out, over/under, clockwise, counter-clockwise and the like. Such descriptions are merely used to facilitate the discussion in light of configurations shown and are not intended to restrict the application of embodiments described herein to any particular orientation. The description may use the phrases "in one embodiment," or "in one or more embodiments," or "in some embodiments", which may each refer to one or more of the same or different embodiments. Furthermore, the terms "comprising," "including," "having," and the like, as used with respect to embodiments of the present disclosure, are synonymous.

The terms "coupled with," along with its derivatives, and "connected to" along with its derivatives, may be used herein, including in the claims. "Coupled" or "connected"

may mean one or more of the following: "coupled" or "connected" may mean that two or more elements are in direct physical or electrical contact; "coupled" or "connected" may also mean that two or more elements indirectly connect to each other, e.g., not in physical contact, but yet still cooperate or interact with each other, and may mean that one or more other elements are coupled or connected between the elements that are said to be coupled with or connected to each other.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The rotatable interface and method described herein provides for a way to ascertain the relative location of rotatable interface, e.g., amount of angular movement, and direction of rotation without the need to transition through multiple states and without the need for baseline calibration. The rotatable interface may be configured to return to its original position when released and, in certain embodiments, may be configured to rotate to a maximum angle in the clockwise and/or counterclockwise directions. The rotatable interface configuration and method described herein may avoid the need for baseline boot-up, may avoid complicated baseline relaxation methods according to environmental changes, and may provide for reporting different rotational speeds.

Figure 1:
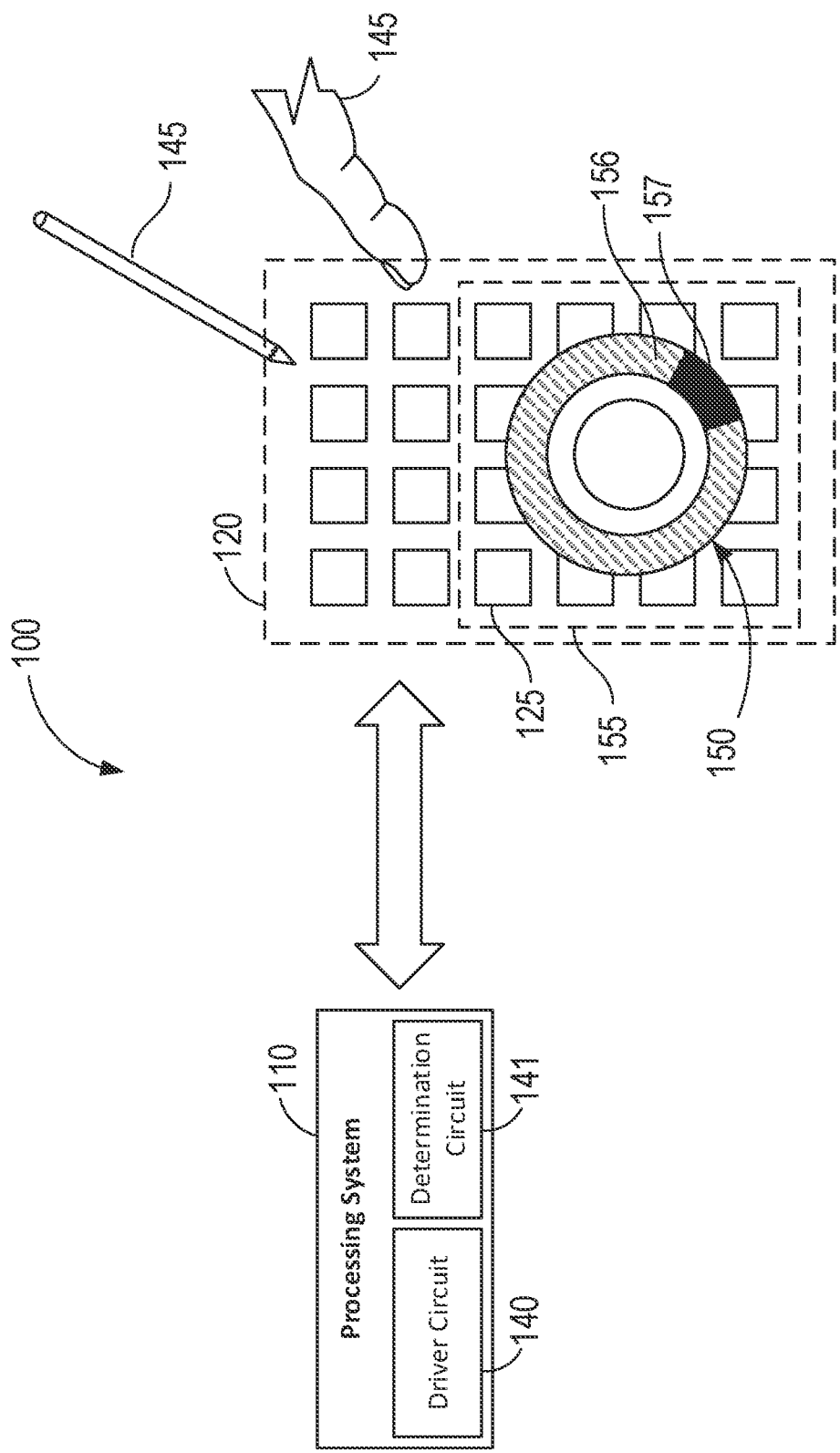
FIG. 1 depicts an example input device with a rotatable interface, according to one or more embodiments.

FIG. 1 is a block diagram of an exemplary electronic device 100. The electronic device 100 may be configured to provide input to an electronic system (not shown), and/or to update one or more devices. The term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include the electronic device 100 and separate joysticks or key switches. Further example electronic systems include peripherals such as data input devices (including remote controls and mice), and data output devices (including display screens and printers). Other examples include remote terminals, kiosks, video game machines (e.g., video game consoles, portable gaming devices, and the like), and internet of things (IOT) devices. Other examples include communication devices (including cellular phones, such as smart phones), and media devices (including recorders, editors, and players such as televisions, set-top boxes, music players, digital photo frames, and digital cameras). In other embodiments, the electronics system may be part of an automobile, and the electronic device 100 represents one or more sensing devices of the automobile. In one embodiment, an automobile may include multiple electronic devices 100, where each electronic device 100 may be configured differently than the other.

The electronic device 100 can be implemented as a physical part of the electronic system, or can be physically separate from the electronic system. As appropriate, the electronic device 100 may communicate with parts of the electronic system using any one or more of the following: buses, networks, and other wired or wireless interconnections. Example communication protocols include Inter-Integrated Circuit (I2C), Serial Peripheral Interface (SPI), Personal System/2 (PS/2), Universal Serial Bus (USB), Bluetooth®, Radio Frequency (RF), and Infrared Data Association (IrDA) communication protocols.

In one or more embodiments, the electronic device 100 may utilize any combination of sensor components and sensing technologies to detect user input. For example, as illustrated in FIG. 1, the electronic device 100 comprises one or more electrodes 125 that may be driven to detect objects or update one or more devices. In one embodiment, the electrodes 125 are sensor electrodes of a capacitive sensing device. In such embodiments, electrodes 125 include one or more common voltage electrodes. In other embodiments, the electrodes 125 are electrodes of an image sensing device, radar sensing device, and ultrasonic sensing device. Further yet, the electrodes 125 may be display electrodes of a display device. In some embodiments the electrodes 125 of the electronic device 100 are comprised of the common electrodes and have a common shape. Some of the examples described herein include a matrix sensor input device. As described in detail below, electronic device 100 may be provided with a rotatable interface 150, which may interact directly or indirectly with some or all of electrodes 125.

The sensor electrodes 125 may have any shape, size and/or orientation. For example, the sensor electrodes 125 may be arranged in a two-dimensional array as illustrated in FIG. 1. Each of the sensor electrodes 125 may be substantially rectangular in shape. In other embodiments, the sensor electrodes 125 may have other shapes. Further, each of the sensor electrodes 125 may have the same shape and/or size. In other embodiments, at least one sensor electrode may have a different shape and/or size than another sensor electrode. In various embodiments, the sensor electrodes 125 may be diamond shaped, have interdigitated fingers to increase field coupling, and/or have floating cut-outs inside to reduce stray capacitance to nearby electrical conductors.

In one or more embodiments, some capacitive implementations utilize "self-capacitance" (or "absolute capacitance") sensing methods based on changes in the capacitive coupling between sensor electrodes and an input object. In various embodiments, an input object near the sensor electrodes, such as, for example, finger or stylus 145, alters the electric field near the sensor electrodes 125, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage, or modulated with reference to the transmitter sensor electrodes to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

Capacitive sensing devices may be used for detecting input objects in proximity to and/or touching input devices. Further, capacitive sensing devices may be used to sense features of a fingerprint. Still further, capacitive sensing devices may be provided with a rotatable interface that is electrically coupled to the capacitive sensing device, and may be used to sense the rotary position of the rotary knob. In some embodiments, the rotatable interface may have a home position and various angular positions, and a compressed and uncompressed position. The sensing device may be used to determine when the rotatable interface is in the home position or other angle, and when it is in the compressed position or uncompressed position based on a change in capacitive coupling of one or more of electrodes 125.

A processing system 110 is shown as part of the electronic device 100. The processing system 110 is configured to operate hardware of the electronic device 100. As illustrated in FIG. 1, processing system 110 comprises a driver circuit or module 140, which may include a signal generator. In one or more embodiments, the driver circuit 140 generates sensing signals with which to drive electrodes 125. In various embodiments, the processing system 110 comprises parts of or all of one or more integrated circuits (ICs) and/or other circuitry components.

In some embodiments, the processing system 110 also comprises electronically-readable instructions, such as firmware code, software code, and/or the like. In some embodiments, components of the processing system 110 are located together, such as, for example, near sensing element(s) of the electronic device 100. In other embodiments, components of processing system 110 are physically separate with one or more components in proximity to the sensing element(s) of electronic device 100, and one or more components elsewhere. For example, the electronic device 100 may be a peripheral coupled to a desktop computer, and the processing system 110 may comprise software configured to run on a central processing unit (CPU) of the desktop computer and one or more integrated circuits (ICs) (perhaps with associated firmware) separate from the CPU. As another example, the electronic device 100 may be physically integrated in a phone, and the processing system 110 may comprise circuits and firmware that are part of a main processor of the phone. Further yet, the processing system 110 may be implemented within an automobile, and the processing system 110 may comprise circuits and firmware that are part of one or more of the electronic control units (ECUs) of the automobile. In some embodiments, the processing system 110 is dedicated to implementing the electronic device 100. In other embodiments, the processing system 110 also performs other functions, such as operating display screens, driving haptic actuators, etc.

The processing system 110 may be implemented as one or more modules and/or circuits that operate different functions of the processing system 110 (e.g., driver module or circuit 140, or determination circuit 141). Each module may comprise circuitry that is a part of the processing system 110, firmware, software, or a combination thereof. In various embodiments, different combinations of modules and/or circuits may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In some embodiments, the electronic device 100 may be implemented as a chip, or as one or more chips. In some embodiments, the electronic device 100 may comprise a controller, or a portion of a controller, of electronic device 100.

In one or more embodiments, a display driver (e.g., driver circuit 140) may be configured for both display updating and input sensing, and may, for example, be referred to as including touch and display driver integration (TDDI) technology. In such embodiments, driver circuit 140 may be implemented as a TDDI chip, or a portion of a TDDI chip. In one or more embodiments, the electronic device may include matrix sensor and may also include TDDI technology.

In one or more embodiments, the processing system 110 further includes determination circuit 141. In one or more embodiments, the determination circuit 141 may be configured to determine changes in a capacitive coupling between each modulated sensor electrode and an input object, such as input objects 145, and/or rotatable interface, from the resulting signals. In one embodiment, all of sensor electrodes 125 may be simultaneously operated for absolute capacitive sensing, such that a different resulting signal is simultaneously received from each of the sensor electrodes or a common resulting signal from two or more sensor electrodes. In another embodiment, some of the sensor electrodes 125 may be operated for absolute capacitive sensing during a first period and others of the sensor electrodes 125 may be operated for absolute capacitive sensing during a second period that is non-overlapping with the first period. In some embodiments, one or more of the sensor electrodes 125 may be operated in connection with the rotatable interface 150 to determine the angle of rotation relative to the home position and/or other characteristics of the rotatable interface 150.

In some embodiments, the processing system 110 responds to user input (or lack of user input) directly by causing one or more actions. Example actions include changing operation modes, as well as graphic user interface (GUI) actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions. Further, in some embodiments, the processing system 110 is configured to identify one or more objects, and the distance to these objects. In some embodiments the processing system 110 is configured to identify one or more rotational changes of the rotatable interface 150, or one or more changes of state of rotatable interface 150, or both, and map those changes to desired actions.

For example, in some embodiments, the processing system 110 operates electrodes 125 to produce electrical signals (resulting signals) indicative of input (or lack of input) in a sensing region. The processing system 110 may perform any appropriate amount of processing on the electrical signals in producing the information provided to the electronic system. For example, the processing system 110 may digitize analog electrical signals obtained from the electrodes 125. As another example, the processing system 110 may perform filtering or other signal conditioning, or, as yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, recognize fingerprint information, distance to a target object, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In one or more embodiments, the processing system 110 is configured to generate a voltage signal to drive the electrodes 125 during a display update interval and an input sensing interval, respectively. In such embodiments, the voltage signal generated to drive the electrodes 125 during a display update interval is a substantially constant, or fixed voltage, and the voltage signal generated to drive the electrodes 125 during an input sensing interval may be referred to as a sensing signal, having a waveform with a periodically variable voltage. In one or more embodiments, the value of a voltage signal to drive the electrodes 125 during a display update interval may be predetermined. For example, the voltage value may be provided by a manufacturer of electronic device 100 and/or the electrodes 125, and may be device-specific to electronic device 100.

In one embodiment, the driver circuit 140 comprises circuitry configured to provide the sensing signal. For example, the driver circuitry may include an oscillator, one or more current conveyers and/or a digital signal generator circuit. In one embodiment, the driver circuitry generates the voltage signal based on a clock signal, the output of the oscillator and the parameters discussed above.

As noted above, in one or more embodiments, the driver circuit 140 generates a signal to drive the electrodes 125 during each of the display update periods and input sensing update periods. In such embodiments, an input sensing update period is provided in between two display update periods. In some implementations, the input sensing update period may be of a shorter duration than a display update period. In such embodiments, there are several display update periods and input sensing update periods per display frame. In one or more embodiments, by acquiring the resulting signals the amount of rotation of the rotatable interface 150, as well as other characteristics, may be tracked.

The rotatable interface 150 may be provided on top of the display panel 120, and may be electrically coupled to some or all of electrodes 125 that are positioned near or below it. In one or more embodiments, the rotatable interface 150 may provide alternate ways for a user to provide input to electronic device 100 other than touching, or hovering near, a display screen with a finger or stylus 145.

In the depicted example of FIG. 1, the rotatable interface 150 is mounted onto the display panel 120, and may have a full (as shown in FIG. 1) or partial overlap with the display panel 120. The rotatable interface 150 cooperates with a stationary base (not visible in the top plan view of FIG. 1) that is provided with various sets of base electrodes, contacts or pads, which in certain embodiments are configured to couple with respective sets of electrodes of the display panel 120, such as one or more sets of electrodes that are provided with sensing signals and/or with sets of electrodes that are provided with reference signals. In one or more embodiments, the stationary base may include different conductive regions respectively connected to corresponding sets of coupling electrodes. In one or more embodiments, the stationary base may comprise a separate base piece with the base contacts attached thereto. In other embodiments the stationary base may comprise base contacts affixed directly to the surface of the display panel 120 without a separate base piece.

In certain embodiments, the rotatable interface 150 includes a rotary wheel (e.g., a knob) that sits above, and rotates relative to, the display panel 120 and the stationary base. In such embodiments, a bottom, or area near the bottom, of the rotary wheel includes one more conductive regions 157 and non-conductive 156 regions (cross-hatched region) in a peripheral region, configured to align (e.g., overlap) with the conductive regions of one or more of the base contacts so that there are various electrical couplings between the conductive regions of the base and the various conductive and non-conductive regions in the peripheral region of the rotary wheel. These components are further configured such that these electrical couplings vary as the rotary wheel is rotated. By detecting the effects of the variances in the electrical couplings on resulting signals received on the display panel via the base contacts, the input device can determine a rotation, or a change in rotation, of the rotatable interface 150. Alternate configurations and relative arrangements of both the conductive regions of the stationary base, and the placement of the conductive and non-conductive regions of the rotary wheel are possible, all within the scope of this disclosure. The conductive region 157 is further described in connection with the rotatable contact 304 (see FIG. 3).

In one or more embodiments, rotation imparted to the rotatable interface by a user, in either relative or absolute terms, may be detected by the electronic device 100. In certain embodiments, the rotatable interface 150 may only be rotatable to a maximum angle in the clockwise and/or counterclockwise directions. In certain embodiments, the rotatable interface 150 may automatically return to its home position when released by the user. Automatic return of the rotatable interface may be implemented using any suitable means, for example, including one or more springs or springlike structures and/or weights embedded within the rotatable interface.

In one or more embodiments, the rotatable interface 150 may also be pressed downwards by a user, and may thus have two positions, an "uncompressed" position, and a "compressed" position, which a user maintains by, for example, pushing down on the rotatable interface 150 against one or more biasing springs. In one or more embodiments, the rotatable interface 150 has a cover. In alternate embodiments, the rotatable interface may be pressed downwards so as to rest at multiple positions, and thus may have multiple states between an "uncompressed" and a "fully compressed" position. In the uncompressed position the cover is at a greater distance above the rotary wheel than in the compressed position. In one or more embodiments, the rotary wheel may have several switches provided between it and the cover, these switches may include the biasing springs.

In one or more embodiments, direction (e.g., clockwise versus counterclockwise) and degree (e.g., angle) of rotation, as well as a user pressing down on, or ceasing to press down upon, the rotatable interface 150, may be interpreted by processing system 110, such as, for example, by determination circuit 141, and may be mapped to various user input actions, signals, or directives.

It is noted that in one or more embodiments a user may manipulate, e.g., rotate, the rotatable interface 150 in various ways, for example, grabbing an outer housing of the rotatable interface and turning it, grabbing a top of the rotatable interface, or a flange protruding from the side of the rotatable interface and turning it, or placing one or more fingertips in or on a recessed channel on an upper surface of the rotatable interface.

In one or more embodiments, the electronic device 100 of FIG. 1 may be provided in an automobile. For example, it may be affixed to a substantially vertical display screen provided in a central part of a dashboard. In one or more embodiments, all the electrodes not physically blocked by the rotatable interface 150, whether the electrodes 125 are inside or are outside of region 155 (described below), remain active. Thus, in such embodiments, both touches away from the interface, and rotations of the interface, may be detected and reported by the electrodes 125 at the same time.

In alternate embodiments, all other forms of user input besides those received via the rotatable interface 150 may be disabled on the electronic device. Thus, in such embodiments, the electrodes 125 are not driven during the sensing interval to perform their standard sensing functionality. As a result, if a finger or other object 145 is moved into, or away from, its vicinity, no resulting signal is obtained, or if obtained, it is not processed. In such alternate embodiments, this may be done to prevent a driver of the automobile from attempting to touch the display panel 120 while driving, as a safety measure, and thus to only interact with the electronic device 100 via the rotatable interface 150. In such alternate embodiments, the disabling of standard sensing functionality of the electrodes 125 may be implemented during specified activities of the automobile, but not during others. For example, the disabling of standard sensing functionality of the electrodes 125 may be implemented while the automobile is in actual motion, but at all other times some of the electrodes 125, for example, those not near enough to the rotatable interface to interfere with signals acquired from it, may be operated to perform standard sensing, as described above.

Thus, in some alternate embodiments, when all of the electrodes 125 are disabled from standard sensing, whether during actual driving of the automobile, or whether at all times, as the case may be, the only way that a driver of the automobile can provide input to the electronic device 100 is via the rotatable interface 150, using a pre-defined set of rotations and/or pressings of the rotatable interface 150. These motions modify a resulting signal which is received by the electronic device 100 during a sensing period, which then interprets them, for example, using determination circuit 141. The resulting signal may be the same signal as the sensing signal that driver circuit 140 drives an electrode 125 with, after being modified by the capacitive coupling of the rotatable interface 150.

In other alternate embodiments, for example, only some of the electrodes 125, in particular those that are near or beneath the rotatable interface 150, are disabled from standard capacitive sensing, and the remainder of the electrodes 125 on the electronic device 100 may still be operative for standard capacitive sensing. In such alternate embodiments, the electrodes that are disabled for standard capacitive sensing are those that are close enough to the rotatable interface 150 such that driving them with standard sensing signals may interfere with the resulting signals obtained from various sets of the electrodes 125 that are respectively electrically coupled to the coupling electrodes of the rotatable interface 150. To illustrate this feature, in FIG. 1 there is shown a dashed line boundary 155. Electrodes 125 within the boundary 155 are in a "blackout zone" and not driven with a standard sensing signal. Rather, as described in detail below, any of the electrodes within the blackout zone that are electrically coupled to the rotatable interface are driven so as to capture rotations and compressions of the rotatable interface, as described below.

In general, within the blackout zone, several sets of the electrodes 125 are coupled to corresponding sets of base coupling electrodes (base contacts) of the base of the rotatable interface 150. In embodiments, the first set are driven with a reference signal, which may be a ground signal. The remaining sets are driven with a sensing signal to obtain a resulting signal modified by the then extant relative rotational relationship of the rotary wheel to the display panel 120 (and hence base contacts of the rotatable interface 150. Thus, in each of these alternate embodiments, all of the electrodes within the blackout zone boundary 155 may be disabled from standard capacitive sensing at all times. As used herein, the term "disabled electrode" may refer to an electrode that is not driven at all, an electrode that is driven with a guard signal, or one that is driven with a constant signal.

As noted above, in certain embodiments, sets of sensor electrodes of the electronic device 100 are electrically coupled to corresponding sets of base contacts of the rotatable interface 150. During an input sensing period, a reference signal is supplied by the driver module 140 to a first set of the electrodes 125, and a sensing signal is supplied to other sets of the electrodes 125. In one or more embodiments, the reference signal may be a configurable direct current (DC) output provided by the processing system 110. In some embodiments, the DC signal may be a ground signal of the electronic device 100. In some embodiments, a resulting signal is obtained from each of other sets of the electrodes 125, where the resulting signals is the sensing signal as modified by the rotational state of the rotatable interface 150. The resulting signals are interpreted by the determination circuit 141 to determine, for example, amount or angle of rotation of the rotatable interface 150. In one or more embodiments, the rotation may be determined in relative terms, such as, for example, a differential angular change from a prior position, or, for example, in absolute terms, such as, for example, a positive or negative angular change from a home position. In such embodiments, one or more user commands may be mapped to absolute rotational distance. For example, the amount of rotation, e.g., angle, may correspond to a speed at which items are displayed or cycled in a list.

Details regarding the structure of exemplary rotatable knob interfaces which may be depressed and corresponding switches is described in U.S. Pat. No. 10,921,913, which is incorporated by reference herein in its entirety. As shown, for example, in FIGS. 4A-4C of U.S. Pat. No. 10,921,913, a rotatable knob may include a fixed base (e.g., element 231 of U.S. Pat. No. 10,921,913), which may be disposed over an array of electrodes of an input device (such as the sensing electrodes of a touchscreen display panel). A fixed base may include two sensing electrodes (e.g., elements 410 and 411 of U.S. Pat. No. 10,921,913) on the fixed base for sensing rotation of the knob interface, and the fixed base may further include a ground pad, which may correspond to a set of grounded electrodes on the fixed base (e.g., element 430 of U.S. Pat. No. 10,921,913) which are configured to couple to corresponding grounded electrodes of the input device (e.g., element 403 of U.S. Pat. No. 10,921,913) driven with a reference signal and thereby provide capacitive loading for knob sensing through the sensing electrodes of the fixed base.

Figure 2:
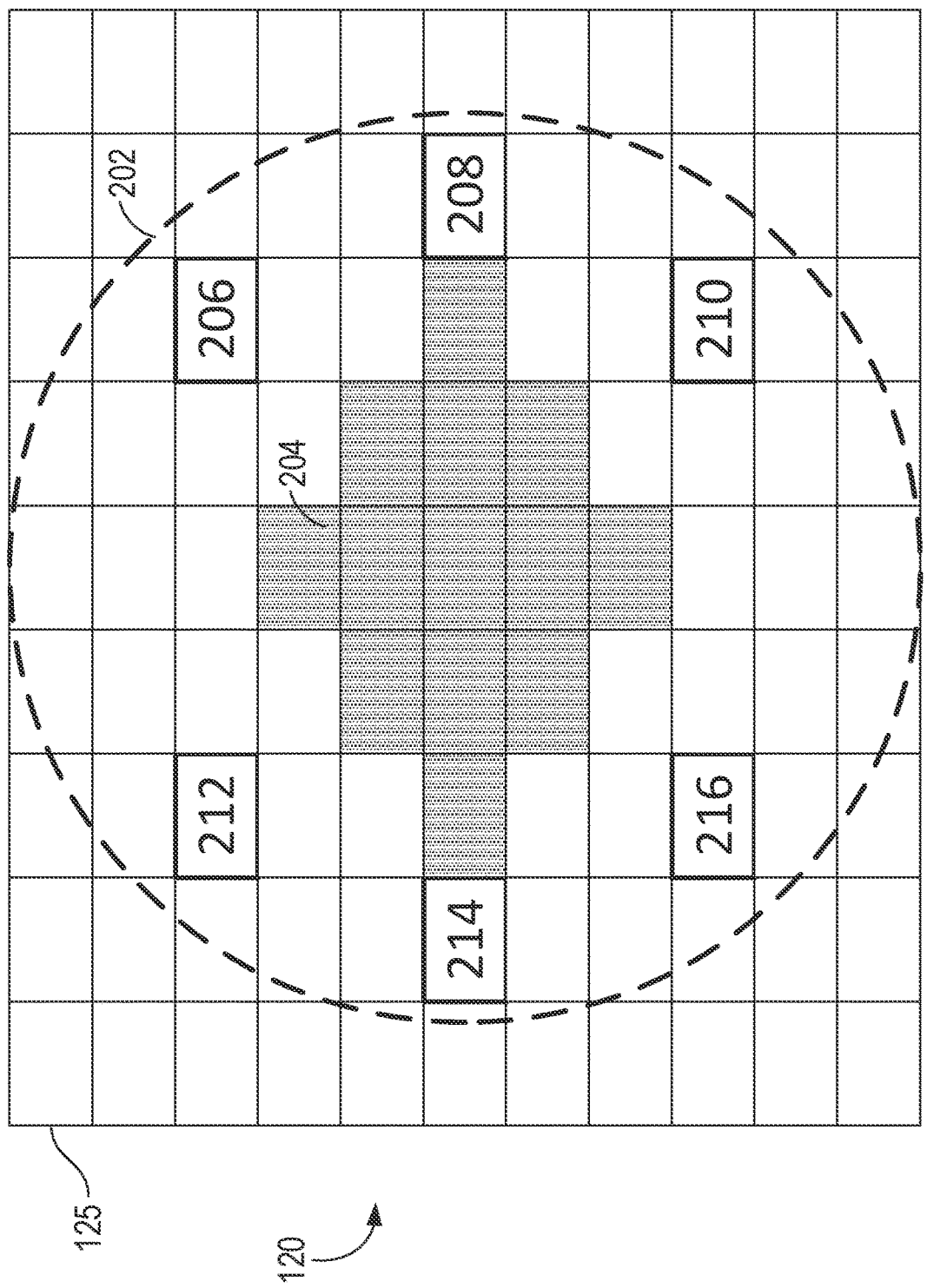
FIG. 2 depicts an example of an interface base including base contacts, according to one or more embodiments.

FIG. 2 depicts a base 202 that cooperates with the rotatable interface 150 according to certain embodiments. Shown are a portion of the display panel 120 (e.g., region 155 of FIG. 1) proximate to the rotatable interface 150 including sensor electrodes 125. Also shown are a plurality of conductive pads 204 through 216.

The sensor electrodes 125 may be capacitive sensor electrodes driven with sensing signals and/or used to read resulting signals in the manner previously described. The base 202 may be a separate base piece on which conductive pads 204 through 216 are affixed or otherwise disposed. Alternatively, a separate base piece may be eliminated and the conductive pads 204-216 may be applied directly to the display panel 120, or may be disposed beneath or within a cover layer of the display panel 120, in which case region 202 represents the approximate boundary of the area underneath the rotatable interface 150 (see FIG. 3). The shape of the base 202 is shown as circular, which generally corresponds to a rotatable interface 150 having, in plan view, a circular face, e.g., a rotatable interface having an overall cylindrical configuration such as a knob or wheel. It will, however, be appreciated that the rotatable interface 150 can have any suitable shape in which case the configuration of the base portion 202 will generally match accordingly.

The conductive pads generally labeled 204 (shaded and also referred to herein as "base reference contacts") are conductive pads configured to carry a reference signal. As previously described, the reference signal may be ground or some other signal. It will be appreciated that while a particular pattern and number of base reference contacts 204 are shown, any suitable arrangement, pattern and number of pads may be employed. The reference signal may be a reference signal of the electronic device 100 and may be applied to the base reference contacts 204 using any suitable arrangement, including direct connection to the base reference contacts 204 or by way of coupling with one or more sensor electrodes 125.

Conductive pads 206-216 are referred to as base contacts. The base contacts 206-216 may be driven with a sensing signal, either directly or through coupling with other sensor electrodes, and may be read either directly or via coupling to other sensor electrodes. The base contacts 206-216 are shown in a particular arrangement generally around the perimeter of the region 202. It will be understood that the number of base contacts used and their precise arrangement in the region 202 may vary depending on the corresponding conductive region 157 on the rotatable interface and the size and shape of the rotatable interface 150. Any suitable number of base contacts may be used with the number of contacts generally corresponding to greater detection granularity as will be apparent from the description that follows. Although the base contacts 206-216 are shown as generally evenly spaced about the perimeter of the base 202, in other embodiments, the base contacts 206-216 may be unevenly spaced.

The conductive pads used for the base contacts and base reference contacts may be made of any suitable conductive material. Non-limiting examples of suitable conductive materials include silver, copper, gold, platinum, and palladium. Further, the base contacts 206-216 and base reference contacts 204 are shown as having a rectangular shape, but may have any suitable shape sufficient to provide electrical coupling with corresponding contacts on the rotatable interface 150 in accordance with the description that follows. The size and shape of the base contacts 206-216 and base reference contacts 204 may be different from the size and shape of the sensor electrodes 125.

As will become apparent from the description that follows, resulting signals read from one or more of the base contacts 206-216 are used to determine the position, angle of rotation, and direction of movement of the rotatable interface 150. Such information can, for example, be mapped to and used to execute various functionality.

Figure 3:
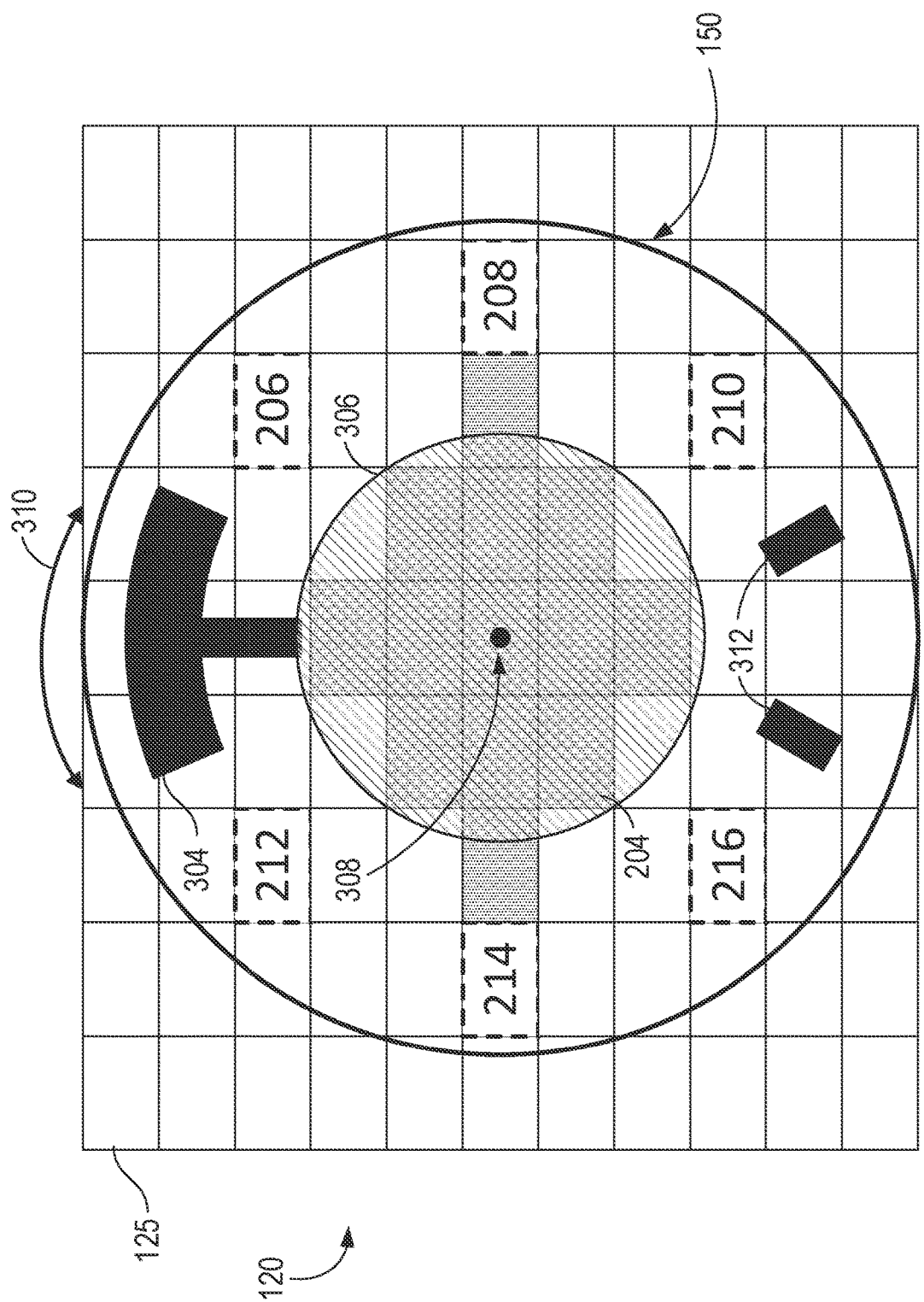
FIG. 3 depicts the base of FIG. 2 overlaid by a rotatable interface, according to one or more embodiments.

FIG. 3 illustrates the rotatable interface 150 superimposed on top of the base portion 202 of the display panel 120 shown and described in connection with FIG. 2. The rotatable interface 150 includes an interface reference contact 306. The interface reference contact 306 area is generally disposed at or near the bottom of the rotatable interface 150. The interface reference contact 306 may, for example, be on a bottom surface of the rotatable interface 150 or may be disposed within, but proximate to, the bottom surface of the rotatable interface 150. The rotatable interface 150 is disposed above and in sufficient proximity to the display panel 120 to permit electrical coupling of the interface reference contact 306 with base reference contacts 204. The interface reference contact 306 thus generally overlaps a portion of the base reference contact 204 in plan view.

The rotatable interface 150 also includes rotatable contact 304. As shown, the rotatable contact 304 is electrically connected or otherwise coupled to the interface reference contact 306. Similar to the interface reference contact 306, the rotatable contact 304 may, for example, be on a bottom surface of the rotatable interface 150 or may be disposed within, but proximate to, the bottom surface of the rotatable interface 150. The rotatable contact 304 may be of any suitable shape that provides for coupling with the base contacts 206-216 as will be apparent from the description below. The rotatable contact 304 and interface reference contact 306 may be made of any suitable conductive material, e.g., silver, copper, gold, platinum, or palladium.

The rotatable interface 150 is configured to rotate when manipulated, e.g., when turned by a user. The rotatable interface 150 may be configured to rotate about an axis 308 in either a relative clockwise or counterclockwise fashion as illustratively shown by arrow 310.

When the rotatable interface 150 is rotated, the rotatable contact 304 correspondingly rotates about the axis 308. The rotatable contact 304 is disposed above the display panel 120, but close enough to permit electrical coupling with the base contacts 206-216 when in proximity thereto. In this respect, the rotatable contact 304 is disposed so that when the rotatable interface 150 is rotated, the rotatable contact 304 will pass above, or otherwise in close proximity to, one or more of the base contacts 206-216. When the rotatable contact 304 is above, or in proximity to, one of base contacts 206-216, the rotatable contact 304 electrically couples the reference signal to the respective base contact. In this manner the processing system can detect the location of the rotatable contact 304 and hence the relative amount of movement of the rotatable interface 150 as compared to a home position. The home position may, for example, correspond to the position of the rotatable contact 304 as shown in FIG. 3, e.g., the rotatable contact 304 at an angle of 0°. It will, however, be understood that any angular position can be the home position.

In certain embodiments, the rotatable interface 150 may be rotatable 360° about the axis 308. In other embodiments, the rotatable interface 150 may only be rotatable a limited amount in either of the clockwise or counterclockwise directions. For example, with reference to FIG. 3, the rotatable interface 150 may only rotate to a maximum angle of between 90° to 180° degrees in the clockwise direction and to a maximum angle of between −90° to −180° in the counterclockwise direction. In other embodiments the angles of rotation may be limited to less than 90° and −90°. Any suitable means can be used to limit the angle of rotation of the rotatable interface 150. For example, the internal structure of the rotatable interface 150 may limit its angular motion or external stops, illustratively shown as stops 312, may be employed.

In certain embodiments, the rotatable interface 150 may return to the home position, e.g., the position as shown in FIG. 3, when not subject to manipulation. For example, when a user releases the rotatable interface 150 after turning to a certain degree, the rotatable interface may return to its home position. The rotatable interface 150 may, for example, include a spring or other suitable structure to facilitate return to the home position.

Figure 4:
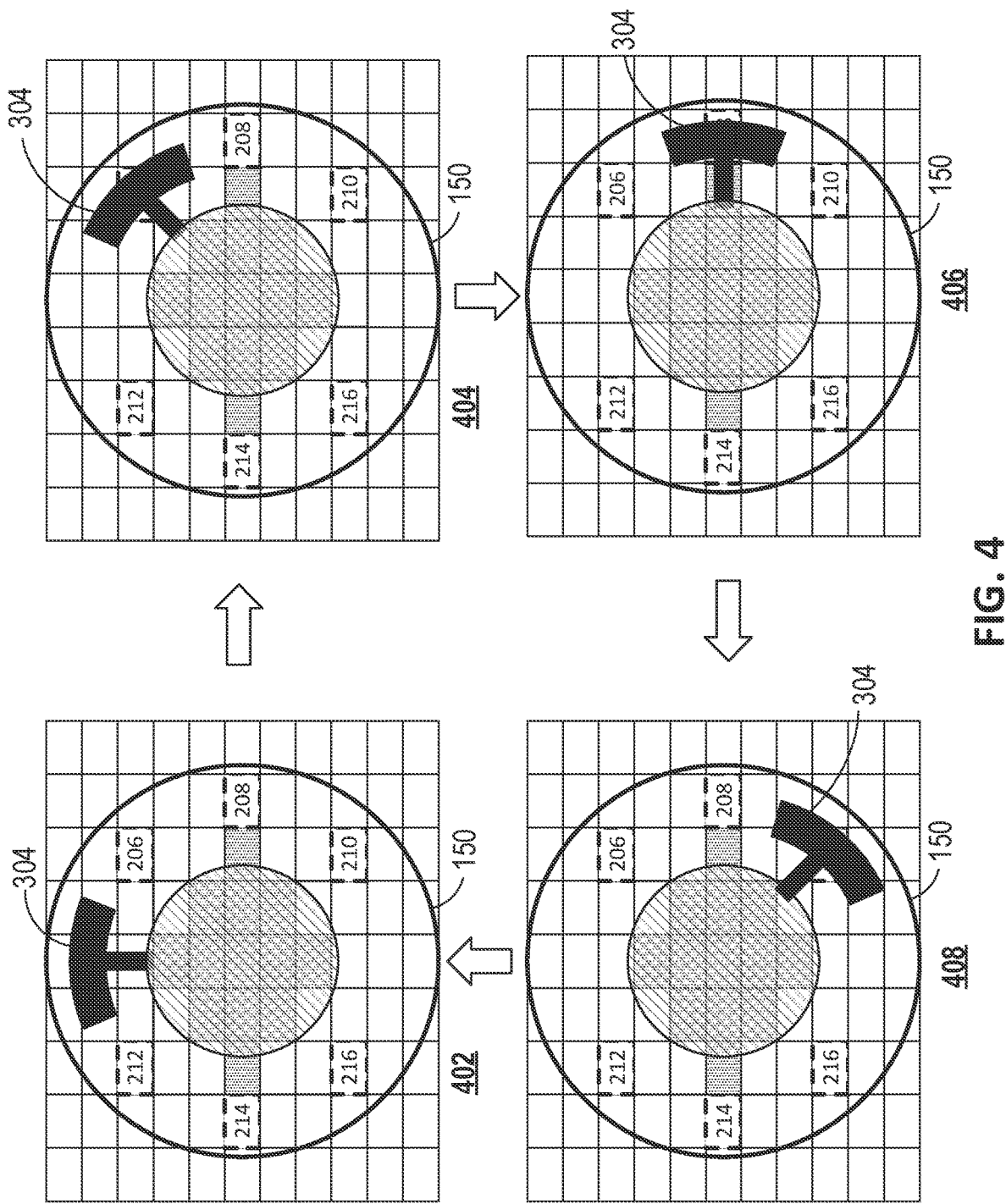
FIG. 4 depicts an example of a rotatable interface that is adjusted through various states or positions, according to one or more embodiments.

FIG. 4 illustrates the rotatable interface 150 turned in a relative clockwise direction through various stages that may be detected by processing system 110.

At stage 402, the rotatable contact 304 is in a home position. In the example shown, the home position corresponds to a position where no base contact is covered either partially or fully by the rotatable contact 304. Further, when in the home position, the rotatable contact 304 does not couple with any base contact. Thus, the processing system 110 detects no change in the signal at base contacts 206-216. Any signal present at each of the base contacts 206-216 with the rotatable interface 150 at the home position can be referred to as a baseline signal for each of the respective base contacts 206-216. The baseline signals can be determined at system startup. Alternatively, the baseline signals can be obtained periodically or as desired during system operation when the rotatable contact is in the home position.

In an alternative embodiment, the home position may correspond to a position where the rotatable contact 304 provides equal coupling with two base contacts. In yet another embodiment, the home position may correspond to a position where the rotatable contact 304 provides a predetermined amount of coupling with one or more base contacts.

At stage 404, the rotatable interface 150 is manipulated, e.g., turned by a user, such that the rotatable contact 304 is directly above base contact 206. This configuration causes coupling of the reference signal via interface reference contact 306 and electrically connected rotatable contact 304 to the base contact 206. The coupling of the reference signal in turn causes a change or variance in a resulting signal read from the base contact 206 (or an electrode coupled to the base contact 206) by, for example, the processing system 110. The processing system may read the resulting signal and determine that the resulting signal (or resulting signal minus a baseline signal) exceeds a threshold thereby establishing that the rotatable contact 304 is directly above or near the base contact 206. In the particular example shown, it can further be determined that the position of the rotatable contact 304 at stage 404 corresponds to an approximate 45° clockwise turn of the rotatable interface 150.

At stage 406, the rotatable interface 150 has been further turned such that the rotatable contact 304 is directly above base contact 208. This configuration will cause coupling of the reference signal via interface reference contact 306 and electrically connected rotatable contact 304 to the base contact 208. The coupling of the reference signal in turn causes a change in the signal read from the base contact 208 (or an electrode coupled to the base contact 208). The processing system 110 may read the resulting signal from the base contact 208 and determine that the resulting signal (or resulting signal minus a baseline signal) exceeds a threshold thereby establishing that the rotatable contact 304 is directly above or near the base contact 208. In the particular example shown, it can further be determined that the position of the rotatable contact 304 at stage 406 corresponds to an approximate 90° clockwise turn of the rotatable interface 150.

At stage 408, the rotatable interface 150 has been further turned such that the rotatable contact 304 is directly above base contact 210. This configuration will cause coupling of the reference signal via interface reference contact 306 and electrically connected rotatable contact 304 to the base contact 210. The coupling of the reference signal in turn causes a change in the signal read from the base contact 210 (or an electrode coupled to the base contact 210). The processing system 110 may read a resulting signal read from base contact 210 and determine that the resulting signal (or resulting signal minus a baseline signal) exceeds a threshold thereby establishing that the rotatable contact is directly above the base contact 210. In the particular example shown, it can further be determined that the position of the rotatable contact at stage 408 corresponds to an approximate 135° clockwise turn of the rotatable interface 150.

As previously described, in certain embodiments, the rotatable interface is configured to automatically return to stage 402 when release from any of the positions as shown in stages 404-408.

Figure 5:
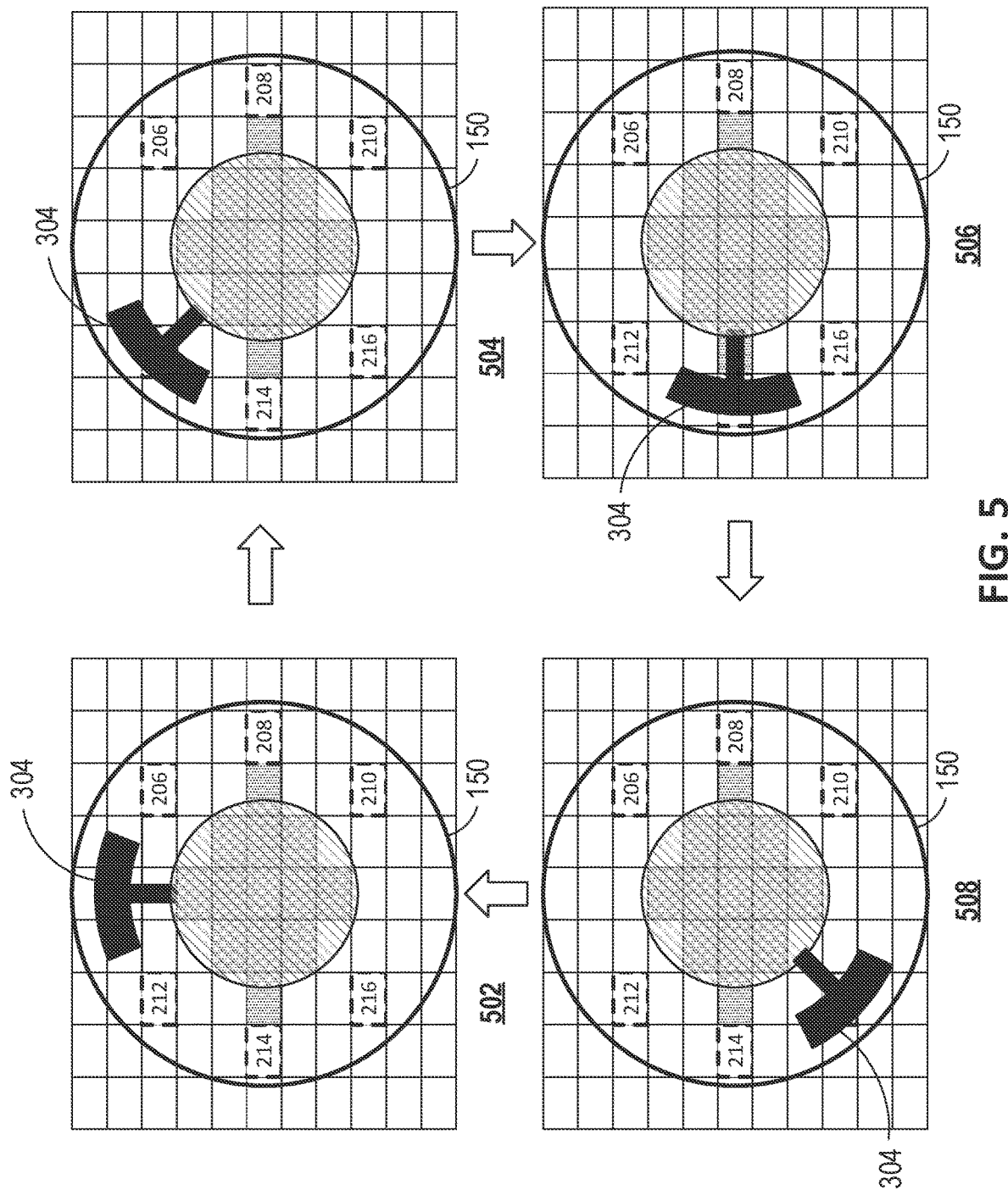
FIG. 5 depicts an example of a rotatable interface that is adjusted through various states or positions, according to one or more embodiments.

FIG. 5 illustrates the rotatable interface 150 turned in a relative counterclockwise direction through various stages that may be detected by processing system 110.

At stage 502, the rotatable contact 304 is in the home position, i.e., the same position at shown at stage 402 in FIG. 4. The processing system can determine that the rotatable interface 150 is in the home position because, for example, no resulting signal from any of the base contacts 206-216 exceeds a threshold.

At stage 504, the rotatable interface 150 is turned such that the rotatable contact 304 is directly above base contact 212. This configuration will cause coupling of the reference signal via interface reference contact 306 and electrically connected rotatable contact 304 to the base contact 212. The processing system 110 may read the resulting signal at base contact 212 (or other coupled electrode) similar to the manner described in connection with FIG. 4 and determine the position and/or relative amount of turn of the rotatable interface 150. In the particular example shown, it can be determined that the position of the rotatable contact at stage 504 corresponds to an approximate −45° clockwise turn of the rotatable interface 150.

At stage 506, the rotatable interface 150 has been turned such that the rotatable contact 304 is directly above base contact 214. This configuration will cause coupling of the reference signal via interface reference contact 306, and electrically connected rotatable contact 304, to the base contact 214. The processing system 110 may read the resulting signal at base contact 214 (or other coupled electrode) similar to the manner described in connection with FIG. 4 and determine the position and/or relative amount of turn of the rotatable interface 150. In the particular example shown, it can be determined that the position of the rotatable contact at stage 506 corresponds to an approximate −90° clockwise turn of the rotatable interface 150.

At stage 508, the rotatable interface 150 has been turned such that the rotatable contact 304 is directly above base contact 216. This configuration will cause coupling of the reference signal via interface reference contact 306, and electrically connected rotatable contact 304, to the base contact 216. The processing system 110 may read the resulting signal at base contact 216 (or other coupled electrode) similar to the manner described in connection with FIG. 4 and determine the position and/or the relative amount of turn of the rotatable interface 150. In the particular example shown, it can be determined that the position of the rotatable contact at stage 508 corresponds to an approximate −135° clockwise turn of the rotatable interface 150.

In connection with FIG. 4 and FIG. 5, the processing system 110 may determine and process resulting signals at any suitable interval. For example, the processing system may determine and process results at intervals of 200 ms. In other embodiments, the interval may be less than 200 ms and in yet other embodiments the interval may be greater than 200 ms.

Differing angles of rotation, e.g., the rotatable contact detected to be above and coupled to various of the base contacts 206-216, may be processed in any suitable manner. For example, the processing system 110 can assign different values to a result which may then be further mapped to certain actions or functionality. For example, as merely on illustrative example, base contact 206 may correspond to a value of 10, base contact 208 may correspond to a value of 20 and base contact 210 may correspond to 40. Similarly, base contact 212 may correspond to a value of −10, base contact 214 may correspond to a value of −20 and base contact 216 may correspond to −40. These values may then be used by an application to determine how to respond to user input.

The position of the rotatable contact 304 of the rotatable interface 150 may correspond to the speed at which items in a list are scrolled through, e.g., channels on an entertainment system or potential locations in a navigation application as but two examples. Base contact 210 may correspond to relatively fast scrolling, while base contact 206 may correspond to slower scrolling as compared to base contact 210. Base contact 208 may correspond to an intermediate rate of scrolling, e.g., between that of base contact 206 and base contact 210. Based contacts 206-210 may correspond to forward scrolling while base contacts 212-216 may correspond to reverse scrolling.

Figure 6:
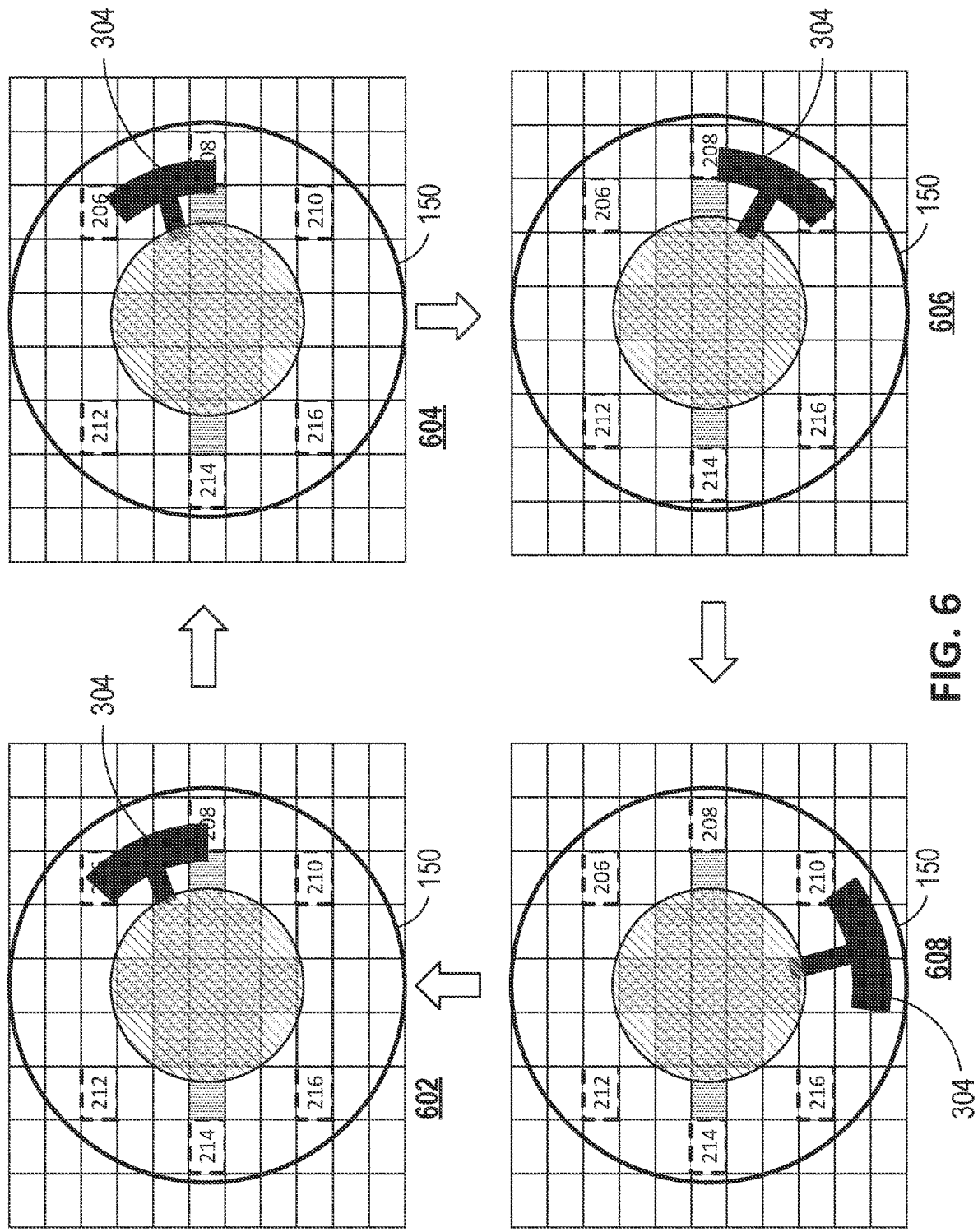
FIG. 6 depicts an example of rotatable interface that is adjusted through various states or positions, according to one or more embodiments.

FIG. 6 illustrates examples of the rotatable interface 150 turned to various degrees such that the rotatable contact 304 does not fully cover and/or is not directly above one or more of the base contacts 206-216. The method and system can determine the position of the rotatable contact 304 and hence the relative amount of turn of the rotatable interface 150 in these scenarios.

At stage 602, the rotatable contact 304 partially covers base contact 206 and partially covers the base contact 208, but in neither case does the rotatable contact 304 fully cover either base contact. In this stage, the rotatable contact 304 is said to be in an effective angle area where the angle of rotation can, for example, be through analysis of signal strength. The processing system 110 may read a resulting signal from the base contact 206 and the base contact 208. In a simple case, if the signal strength (absolute resulting signal strength or resulting signal strength minus baseline) of each base contact 206 and 208 exceeds a threshold and are the same, the processing system 110 can resolve that the rotatable contact 304 is midway between the base contact 206 and the base contact 208. Assuming the base contact 208 is, for example, at 90° and the base contact 206 is, for example, 45°, the foregoing example leads to an approximate angle of rotation of 67.5°.

Stage 604 illustrates an example where the rotatable contact 304 covers most, but not all of the base contact 208, e.g., more than 50 percent, and a relatively small portion, e.g., less than half, of the base contact 206. Thus, the processing system 110 will determine a larger absolute or relative signal strength (absolute resulting signal minus baseline) from the base contact 208 as compared to the base contact 206. An approximation of the angle of rotation can be ascertained as described in connection with FIG. 9.

At stage 606, the rotatable interface 150 is turned such that rotatable contact 304 is above and covers most (e.g., more than half) of the base contact 210 and a portion, but less than half of the base contact 208. Thus, the processing system 110 will determine a larger absolute or relative signal strength from the base contact 208 as compared to the base contact 210. An approximation of the angle of rotation can be ascertained as described in connection with FIG. 9.

At stage 608, the rotatable interface 150 is turned such that rotatable contact 304 is above a portion of the base contact 210, but less than all of the base contact 210. Thus, the processing system 110 will determine an absolute or relative signal strength from the base contact 210, but less than maximum signal that can be determined from the base contact 210, e.g., the resulting signal when the rotatable contact 304 completely covers the base contact 210. An approximation of the angle of rotation can be ascertained as described in connection with FIG. 9.

It will be appreciated that the examples described in connection with FIG. 6 are provided by way of illustration only. The rotatable interface 150 may be turned to any angle and hence the rotatable contact 304 be disposed above any portion of one or more of the base contacts, e.g., the base contacts 206-210. Further, although clockwise rotation from the home position is shown, the rotatable interface is configured to be rotated counterclockwise as previously described. During counterclockwise rotation from the home position, the rotatable contact 304 of the rotatable interface 150 is disposed above one or more, or none, of the base contacts 212-216 according to the angle of counterclockwise rotation.

Figure 7:
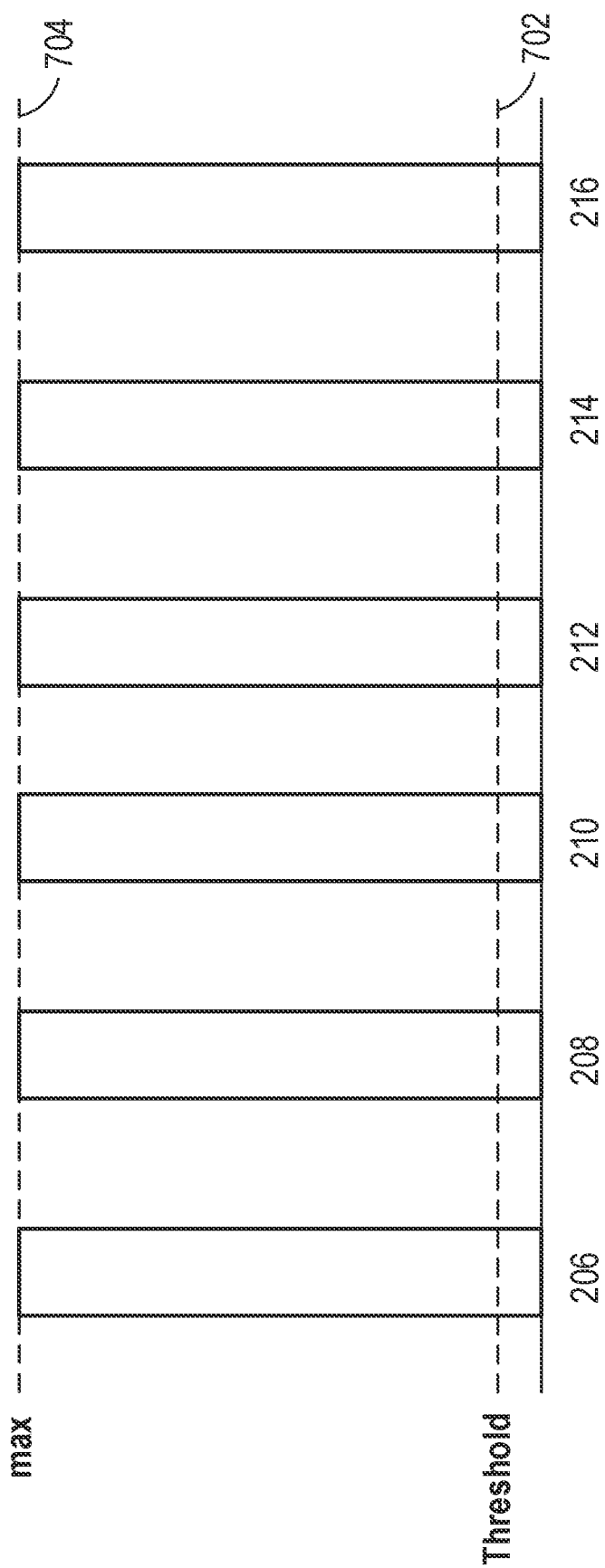
FIG. 7 depicts an example of maximum and threshold signal strengths corresponding to various base contacts, according to one or more embodiments.

FIG. 7 illustrates a range of magnitude of signal strength at each of the base contacts 206-216. The signal strength may be absolute signal strength of the resulting signal or may be a relative signal strength determined by subtracting a baseline measurement from the measured resulting signal.

As shown, each base contact of the base contacts 206-216 has a threshold signal strength 702 and maximum signal strength 704. The maximum signal strength 704 corresponds to the maximum value obtained for a respective base contact, e.g., the signal strength corresponding to a stage where the rotatable contact 304 is directly above and completely covers, or alternatively provides maximum coverage, a particular base contact 206-216, e.g., the stages generally shown in FIGS. 4 and 5. It will be appreciated that although the maximum signal strength is shown as being the same for each of the base contacts 206-216, the value of each base contact may be different. The maximum value may be determined using any suitable method. For example, the maximum value may be from theoretical modeling, experimentally determined or otherwise assumed. The maximum value may also be measured during use as described herein below.

The threshold signal strength 702 is a minimum signal strength at which it assumed that the rotatable contact 304 is at least partially directly above or alternatively proximate to a respective base contact of the base contacts 206-216. Although the threshold signal strength 702 is shown as being the same value for each of the base contacts, the threshold value of each base contact may be different. For example, the threshold may be set higher for base contacts that are subject to a relatively large amount of noise or other interference. The threshold value may be determined using any suitable method, for example, using the methods described in connection with the maximum signal strength.

Figure 8:
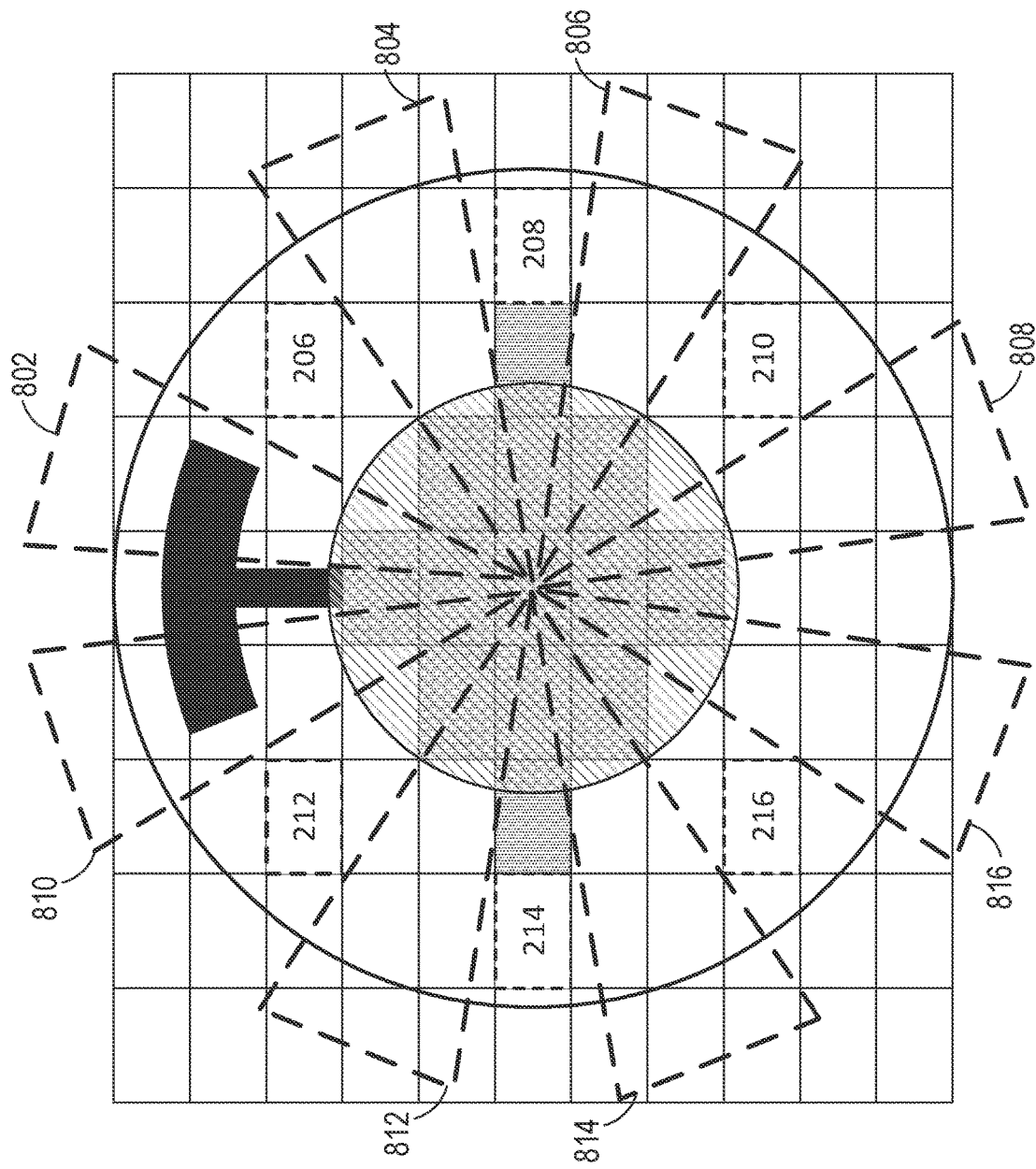
FIG. 8 depicts an example of effective areas through which angle of rotation of a rotatable interface may be determined.

FIG. 8 illustrates effective areas 802-816 superimposed on the rotatable interface 150. The effective areas 802-816 are areas where the angle of rotation can be determined by analyzing signal strength of resulting signals where the rotatable contact 304 covers less than all of any of the base contacts 206-216 and/or in scenarios where the signal strength of resulting signals is less than maximum value as illustratively shown in FIG. 7. In certain embodiments, when the measured signal strength of one of the base contacts 206-216 is at the maximum value, the angle of rotation of the rotatable interface 150 is assumed to be the angle of the respective base contact.

When the signal strength of a resulting signal is less than maximum for one or more the base contacts, the processing system 110 analyzes the signal strength compared the maximum signal strength for the one or more contacts where the threshold is exceeded. From this comparison, the location, or approximate location, of the rotatable contact 304 relative to the base contacts can be determined. The approximate location of the rotatable contact 304 provides the amount of rotation of the rotatable interface 150.

Figure 9:
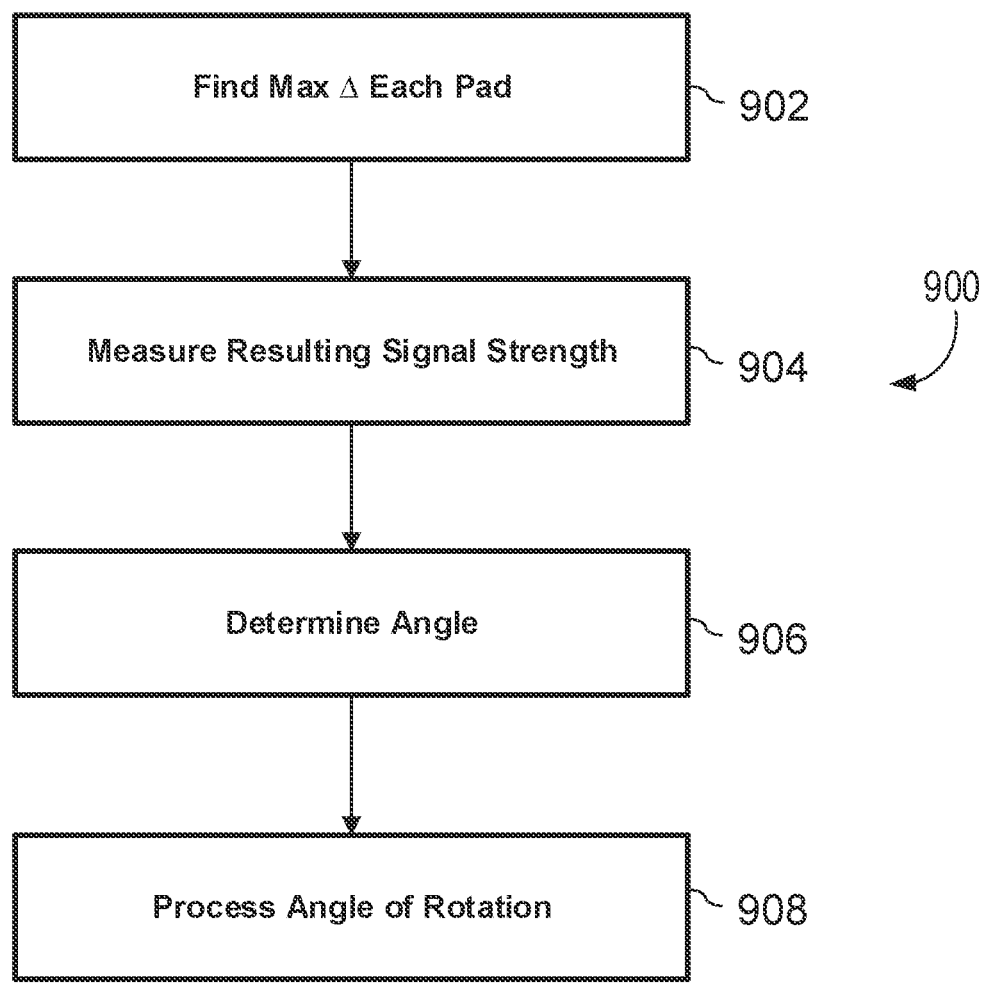
FIG. 9 depicts an example of method of operating a rotatable interface, according to one or more embodiments.

FIG. 9 illustrates a process 900 of operating the rotatable interface 150. The various stages described are by way of illustration in accordance with the previous description. The stages of FIG. 9 need not be performed in the exact sequence shown except where a particular order is apparent from the description.

At stage 902, a maximum delta ($\Delta$) for each of the base contacts 206-216 is set and/or determined. The A for a base contact of the base contacts 206-216 is, for example, a determined (e.g., measured) value of a resulting signal minus a baseline signal obtained during operation of the rotatable interface 150. Thus, the $\Delta$ is a relative signal strength. In certain embodiments, in the alternative or before the maximum $\Delta$ for a particular base contact is measured, the maximum $\Delta$ is set to a predetermined value using any suitable means such as, for example, a theoretical maximum, a value determined by way of experimentation, or by using a default value.

When the maximum $\Delta$ is determined during use, an iterative process may be used to continuously measure the signal strength at each base contact until a maximum value is reached for each of the base contacts. Such process can assume, for example, during clockwise rotation that when a signal from the second base contact 208 exceeds a threshold value (see FIG. 7), then the maximum value of the first base contact 206 has been determined, etc. This process can be summarized as follows for clockwise rotation:

If delta_pad2>pad2_threshold, Max delta_pad1 confirmed.

If delta_pad3>pad 3 threshold, Max delta_pad2 confirmed

If delta_pad<pad2 threshold, Max delta_pad3 confirmed

It will be appreciated that a reciprocal process can be used for counterclockwise rotation.

At stage 904, the relative signal strength of the based contacts 206-216 is determined.

At stage 906, the angle of rotation of the rotatable interface 150 is determined. For example, if a relative signal strength of a base contact of the base contacts 206-216 is at a maximum signal strength, the angle of rotation may be determined to be the angle of the respective base contact relative to, for example, the home position of the rotatable interface 150.

When the relative signal strength of one or more base contacts exceeds its respective threshold, but is less than its respective maximum signal strength, the rotatable interface 150 is rotated such that rotatable contact 304 is in an effective angular area. As illustrated in FIG. 8, the effective angular areas are the angular areas between base contacts. The effective angular areas are thus a function of the number of base contacts, their size as well as the physical attributes of the rotatable interface 150.

When the rotatable contact 304 is in an effective area, the angle of rotation can be determined by analyzing the resulting signal strength from one or more base contacts of the base contacts 206-216 where the signal strength exceeds the threshold value as shown, for example, in FIG. 7. The resulting signal strength minus a baseline is analyzed relative to the maximum $\Delta$ for the respective base contact(s), which can be used to ascertain the position of the rotatable contact 304 with respect to the base contacts.

As an example, and with reference to FIG. 3 through FIG. 6, if the relative signal strength is approximately equal between base contacts 208 and 210, and assuming each signal strength exceeds a threshold, the processing system 110 may determine that the rotatable contact 304 of the rotatable interface is equidistant between base contacts 208 and 210, e.g., rotation of 112.5° relative to the home position. As another example, if the relative resulting signal strength is stronger for the base contact 208 than the base contact 210, and both measured signals resulting signals exceed the threshold, the angle of rotation is between 90° and 112.5°, which value can be further estimated depending on the relative signal strength of each base contact as compared to the maximum Δ for each base contact. The closer the relative resulting signal strength from base contact 208 is to its maximum Δ (and/or the further the relative signal strength from the base contact 210 is to its maximum Δ) the closer the angle is to 90° and vice versa. The angle of rotation may be determined using any suitable means, for example, algorithmically or by comparing relative resulting signal strengths to values in a table correlating signal strength to the angle of rotation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device, comprising:
a processing system;
a display panel;
an interface comprising a base portion and a rotatable interface:
the base portion comprising:
a plurality of base contacts disposed proximal to the display panel and in communication with the processing system;
one or more base reference contacts disposed proximal to the display panel and coupled to a reference signal;
the rotatable interface comprising:
a rotatable contact; and
an interface reference contact coupled to the rotatable contact and to the one or more base reference contacts,
wherein the rotatable interface is configured to rotate about an axis, rotation of the rotatable interface corresponding to rotation of the rotatable contact and producing a variation of signal strength of resulting signals from at least two base contacts of the plurality of base contacts, and wherein the processing system is configured to determine an angle of rotation based on the variation of signal strength, wherein the angle of rotation corresponds to a location between the at least two base contacts.

2. The input device of claim 1, wherein the processing system is further configured to:
compare the variation of signal strength of resulting signals to at least one maximum value to determine the angle of rotation of the rotatable interface.

3. The input device of claim 1, wherein the processing system is further configured to determine a plurality of effective angle areas, wherein each effective angle area of the plurality of effective angle areas corresponds to areas between adjacent base contacts of the plurality of base contacts.

4. The input device of claim 1, wherein the rotatable interface is generally cylindrical and wherein the plurality of base contacts are disposed in circular pattern on the base portion.

5. The input device of claim 1, wherein the plurality of base contacts are directly affixed to the display panel.

6. The input device of claim 1, wherein the display panel comprises a capacitive touch sensor and the plurality of base contacts are capacitively coupled to one or more capacitive sensor electrodes.

7. The input device of claim 1, wherein the rotatable interface is configured to automatically return to a home position such that each base contact of the plurality of base contacts provides a baseline resulting signal.

8. The input device of claim 1, wherein the rotatable interface has limited rotation in a clockwise direction and/or a counterclockwise direction.

9. A method of determining an angle of rotation of a rotatable interface, comprising:
determining a maximum relative signal strength of resulting signals from each of a plurality of base contacts;
determining a plurality of effective areas, each effective area of the plurality of effective areas corresponding to an angular area between adjacent base contacts of the plurality of base contacts;
receiving a resulting signal corresponding to a signal strength of at least two base contacts of the plurality of base contacts; and
determining the angle of rotation of the rotatable interface based on the signal strength of the at least two base contacts of the plurality of base contacts, wherein the angle of rotation corresponds to a location between the at least two base contacts.

10. The method of claim 9, wherein the determining the angle of rotation further comprises analyzing the signal strength of the at least two base contacts relative to the maximum relative signal strength of the at least two base contacts.

11. The method of claim 9, wherein the determining the angle of rotation further comprises:
receiving a resulting signal corresponding to a signal strength of a second base contact of the plurality of base contacts; and
analyzing the signal strength of the second base contact relative to the maximum relative signal strength of the second base contact.

12. The method of claim 9, further comprising determining a plurality of effective angle areas, wherein each effective angle area of the plurality of effective angle areas corresponds to areas between adjacent base contacts of the plurality of base contacts.

13. The method of claim 9, further comprising capacitively coupling at least one of the plurality of base contacts with one or more capacitive sensor electrodes.

14. The method of claim 9, wherein the rotatable interface is configured to automatically return to a home position such that each base contact of the plurality of base contacts provides a baseline resulting signal.

15. The method of claim 9, wherein the rotatable interface has limited rotation in a clockwise direction and/or a counterclockwise direction.

16. An interface comprising:
a base portion comprising:
a plurality of base contacts configured to be disposed proximal to a display panel and in communication with a processing system;
one or more base reference contacts configured to be disposed proximal to the display panel and coupled to a reference signal; and
a rotatable interface comprising:
a rotatable contact;
an interface reference contact coupled to the rotatable contact and configured to be coupled to the one or more base reference contacts,
wherein the rotatable interface rotates about an axis causing corresponding rotation of the rotatable contact, and wherein the interface is configured to produce a variation of signal strength of resulting signals at two or more of base contacts of the plurality of base contacts to provide for determination of an angle of rotation of the rotatable interface, wherein the angle of rotation corresponds to a location between the two or more contacts.

17. The interface of claim 16, wherein the interface is configured to:
compare the variation of signal strength of resulting signals to at least one maximum value to determine the angle of rotation of the rotatable interface.

18. The interface of claim 16, wherein the plurality of base contacts are capacitively coupled to one or more capacitive sensor electrodes.

19. The interface of claim 16, wherein the rotatable interface is configured to automatically return to a home position.

20. The interface of claim 16, wherein the rotatable interface has limited rotation in a clockwise direction and/or a counterclockwise direction.

* * * * *